(12) United States Patent
Benoist

(10) Patent No.: US 6,973,060 B1
(45) Date of Patent: Dec. 6, 2005

(54) ROTATING SYNCHRONIZATION CHANNEL (SCH) TRANSMISSION

(75) Inventor: Sebire Benoist, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/476,500

(22) Filed: Jan. 3, 2000

Related U.S. Application Data

(60) Provisional application No. 60/128,293, filed on Apr. 8, 1999.

(51) Int. Cl.$^7$ .......................... H04Q 7/00; H04B 7/212
(52) U.S. Cl. ..................... 370/331; 370/337; 370/347; 370/510
(58) Field of Search .............. 370/331, 337, 370/347, 350, 526, 528, 529, 510, 507, 503; 375/138

(56) References Cited

U.S. PATENT DOCUMENTS

| | | | |
|---|---|---|---|
| 5,577,087 A | 11/1996 | Furuya | 375/377 |
| 5,737,358 A * | 4/1998 | Ritz et al. | 375/138 |
| 5,778,075 A * | 7/1998 | Haartsen | 375/138 |
| 6,031,826 A * | 2/2000 | Hassan | 370/321 |

FOREIGN PATENT DOCUMENTS

| | | | | |
|---|---|---|---|---|
| DE | 4102412 A1 | 7/1992 | | |
| EP | 0 877 510 A | 11/1998 | ........... | H04L 12/28 |
| EP | 0877510 A2 | 11/1998 | | |
| WO | WO-98/37713 | 8/1998 | | |
| WO | WO-99/00911 | 1/1999 | | |
| WO | WO-99/51052 | 10/1999 | | |

OTHER PUBLICATIONS

The GSM System for Mobile Communications by Michel Mouly and Marie-Bernadette Pautet, 1992, pp. 194, 210, and 336-342.
The GSM System for Mobile Communications by Michel Mouly and Marie-Bernadette Pautet, 1992, pp. 331-336.
GSM TS 101 038 V6.0.0 (Apr. 1999), XP-002201367 "Digital Cellular Telecommunication System (Phase 2+); High Speed Circuit Switched Data (HSCSD); Stage 2 (GSM 03.34 version 6.0.0Release 1997)".

* cited by examiner

*Primary Examiner*—Ricky Ngo
*Assistant Examiner*—Soon D. Hyun
(74) *Attorney, Agent, or Firm*—Harrington & Smith, LLP

(57) ABSTRACT

A method for presenting information to a mobile station that is transmitted during a common idle frame that consists of a set of time slots, comprising arranging individual transmissions such that the mobile station is enabled to receive all pertinent information from a subset of timeslots of the idle frame, without regard for what traffic time slot or slots the mobile station is assigned to. The individual transmissions originate from individual ones of a plurality of base stations, and the base stations are operated so as to alternate or rotate the transmission of bursts within the idle frame. Depending on a number of different bursts to be sent, a particular burst transmitted from one base station is never transmitted in the same time slot during two consecutive idle frames. In a presently preferred, but not limiting, embodiment of this invention the bursts are SCH bursts transmitted from base stations in a synchronous GSM telecommunications system.

6 Claims, 5 Drawing Sheets

| 0 | 1 | 2 | 3 | 4 | 5 | 6 | 7 | IDLE FRAME |
|---|---|---|---|---|---|---|---|---|
| 6 |   | 3 |   | 4 |   | 1 |   | 1st |
| 4 |   | 1 |   | 5 |   | 2 |   | 2nd |
| 5 |   | 2 |   | 6 |   | 3 |   | 3rd |
| 6 |   | 3 |   | 4 |   | 1 |   | ... |

FIG.5

| 0 | 1 | 2 | 3 | 4 | 5 | 6 | 7 | IDLE FRAME |
|---|---|---|---|---|---|---|---|---|
| 10 |   | 4 |   | 7 |   | 1 |   | 1st |
| 11 |   | 5 |   | 8 |   | 2 |   | 2nd |
| 12 |   | 6 |   | 9 |   | 3 |   | 3rd |
| 7 |   | 1 |   | 10 |   | 4 |   | 4th |
| 8 |   | 2 |   | 11 |   | 5 |   | 5th |
| 9 |   | 3 |   | 12 |   | 6 |   | 6th |
| 10 |   | 4 |   | 7 |   | 1 |   | ... |

FIG.6

| 0 | 1 | 2 | 3 | 4 | 5 | 6 | 7 | IDLE FRAME |
|---|---|---|---|---|---|---|---|---|
| 13 |   | 5 |   | 9 |   | 1 |   | 1st |
| 14 |   | 6 |   | 10 |   | 2 |   | 2nd |
| 15 |   | 7 |   | 11 |   | 3 |   | 3rd |
| 16 |   | 8 |   | 12 |   | 4 |   | 4th |
| 9 |   | 1 |   | 13 |   | 5 |   | 5th |
| 10 |   | 2 |   | 14 |   | 6 |   | 6th |
| 11 |   | 3 |   | 15 |   | 7 |   | 7th |
| 12 |   | 4 |   | 16 |   | 8 |   | 8th |
| 13 |   | 5 |   | 9 |   | 1 |   | ... |

FIG.7

ROTATING SYNCHRONIZATION CHANNEL (SCH) TRANSMISSION

CLAIM OF PRIORITY FROM A COPENDING PROVISIONAL PATENT APPLICATION

Priority is herewith claimed under 35 U.S.C. §119(e) from copending Provisional Patent Application 60/128,293, filed Apr. 8, 1999, by Benoist Sebire. The disclosure of this Provisional Patent Application is incorporated by reference herein in its entirety.

FIELD OF THE INVENTION

This invention relates generally to radio telephones and systems, in particular, to radio telephones or mobile stations capable of operating with digital downlink (forward) transmissions from a plurality of base stations.

BACKGROUND OF THE INVENTION

Within a Global System for Mobile Communications (GSM) synchronous network all idle frames of traffic channels occur at the same time, i.e., every 26 Time Division, Multiple Access (TDMA) frames. Reference can be had to a publication entitled "The GSM System for Mobile Communications", by Michel Mouly and Marie-Bernadette Pautet (1992) for an overall description of the GSM system, the conventional GSM 26 multiframe and 51 multiframe signalling structure (see FIG. 4.15 of Mouly et al. and also FIG. 3 herein), as well as a thorough discussion of idle frames and a Base Station Identity Code (BSIC, see generally pages 336–342), and a Synchronization Channel (SCH, see, for example, pages 194 and 210).

During the common idle frame mobile stations read the BSIC (which is carried by SCH bursts) of neighbor cells for handover purposes. As such, the SCH bursts from different base stations are sent in sequence during the idle frame. It is important that a given mobile station does not miss parts of the information sent in the SCH bursts, otherwise handovers will not be reliable.

Although the use of the synchronized network allows all of the mobile stations to always receive the idle frames at the same time, it does not imply that all of the measurement windows will occur at the same time. In practice, the measurement window position depends on which time slot is assigned for traffic use for a particular mobile station. FIG. 4 shows that there exists eight possible measurement windows for the eight possible traffic time slots that may be assigned to a given mobile station (the GSM system uses eight time slots per frame.)

The SCH bursts are transmitted during the idle frame in the downlink (base station to mobile station or forward direction) and, as a result, in accordance with conventional practice the mobile station may not receive some part of it. For example, and if time slot 0 is used, the mobile station will always miss the last burst of the idle frame, while if time slot 7 is used the mobile station will always miss the four first bursts.

OBJECTS AND ADVANTAGES OF THE INVENTION

It is a first object and advantage of this invention to provide an improved technique for increasing the reliability of handovers.

It is a further object and advantage of this invention to provide an improved technique for overcoming the measurement window problem that was described above.

SUMMARY OF THE INVENTION

The foregoing and other problems are overcome and the objects of the invention are realized by methods and apparatus in accordance with embodiments of this invention.

Disclosed herein is a method for presenting information to a mobile station, with the information being transmitted during a common idle frame that consists of a set of time slots. The method arranges individual transmissions such that the mobile station is enabled to receive all pertinent information from a subset of timeslots of the idle frame, without regard for what traffic time slot or slots the mobile station is assigned to. The individual transmissions originate from individual ones of a plurality of base stations, and the base stations are operated so as to alternate or rotate the transmission of bursts within the idle frame. Depending on a number of different bursts to be sent, a particular burst transmitted from one base station is never transmitted in the same time slot during two consecutive idle frames.

In a presently preferred, but not limiting, embodiment of this invention the bursts are SCH bursts transmitted from base stations in a synchronous GSM telecommunications system.

BRIEF DESCRIPTION OF THE DRAWINGS

The above set forth and other features of the invention are made more apparent in the ensuing Detailed Description of the Invention when read in conjunction with the attached Drawings, wherein:

FIG. 5 shows six different SCHs to be sent within an idle frame which must contain four idle bursts;

FIG. 6 shows 12 different SCHs to be sent within the idle frame which must contain four idle bursts; and FIG. 7 shows 16 different SCHs to be sent within the idle frame which must contain four idle bursts.

DETAILED DESCRIPTION OF THE INVENTION

Figure 1:
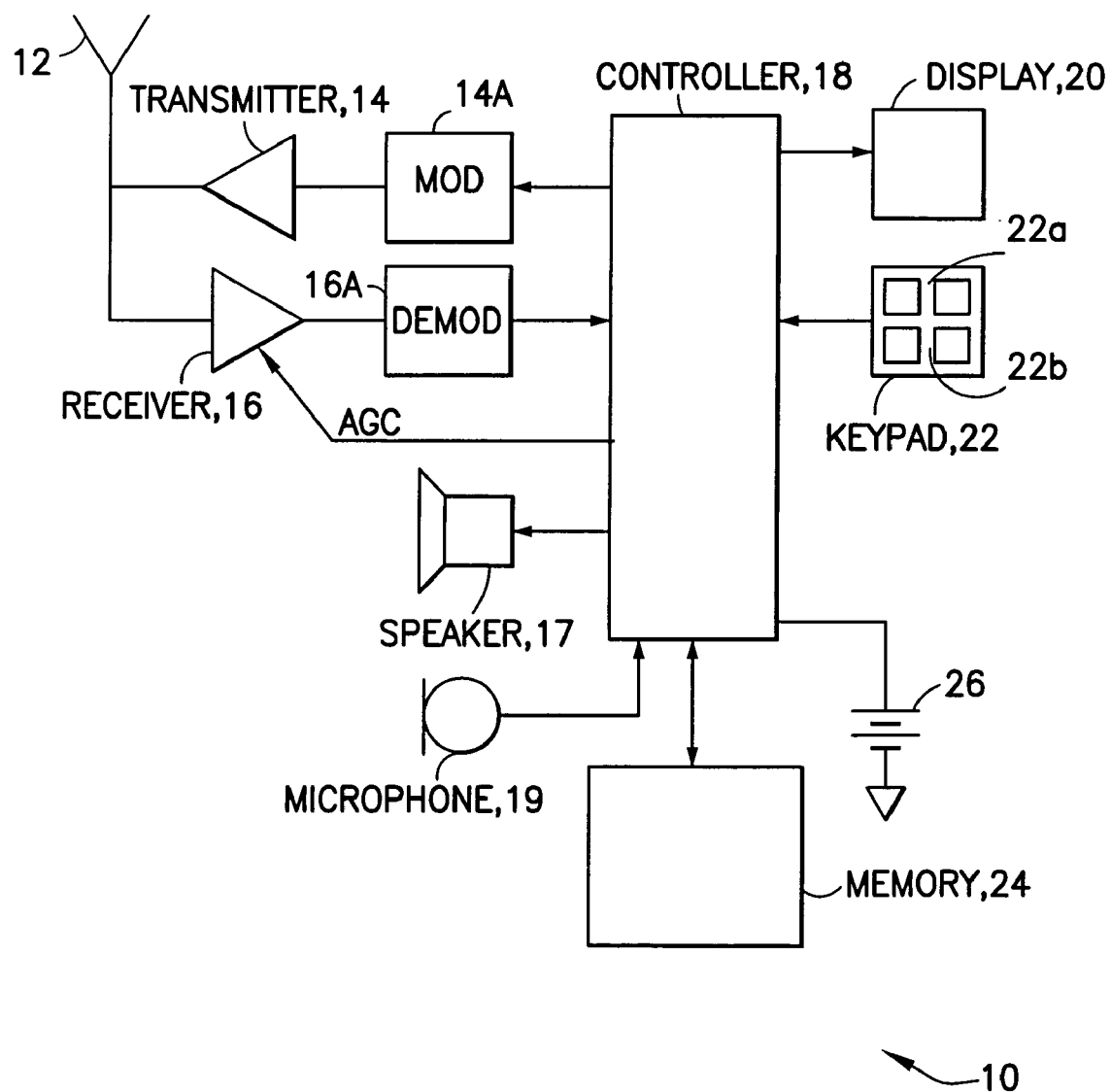
FIG. 1 is a block diagram of an exemplary mobile station that is constructed and operated in accordance with this invention.
Figure 2:
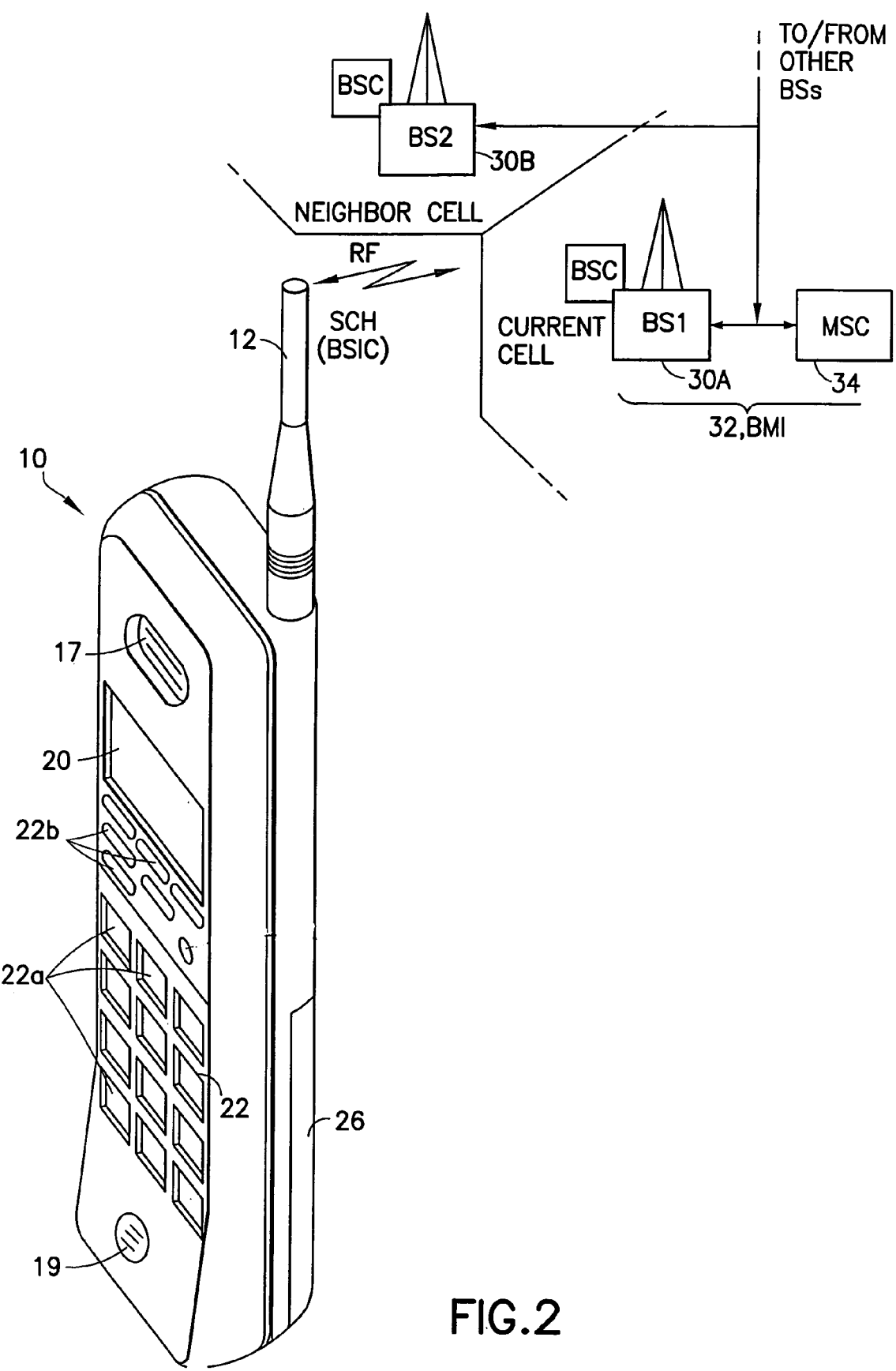
FIG. 2 is an elevational view of the mobile station shown in FIG. 1, and which further illustrates a wireless telecommunication system to which the mobile station is bidirectionally coupled through RF links.
Figure 3:
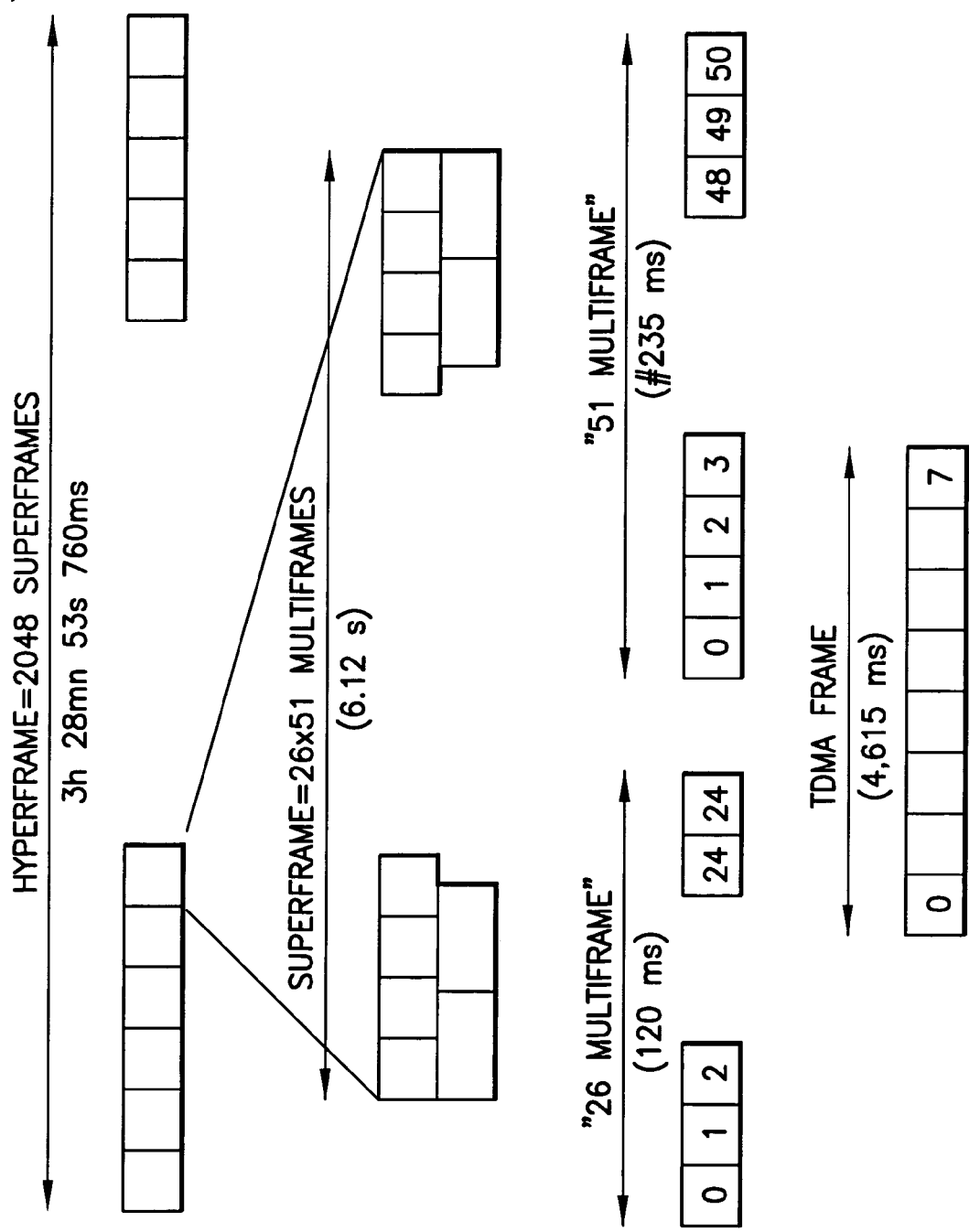
FIG. 3 depicts a conventional GSM frame hierarchy.

Reference is first made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a first base site or base station 30A (also referred to herein as a base transceiver station (BTS)), as well as a second and typically more base stations 30B. The base stations 30A and 30B can be a part of a cellular network comprising a Base Station/Mobile Switching Center/Interworking function (BMI) 32 that includes a mobile switching center (MSC) 34. The MSC 34 provides a connection to landline trunks.

The mobile station 10 typically includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to be a TDMA system of a type described in detail below, although the teaching of this invention is not intended to be limited only to this specific TDMA arrangement, nor is the teaching of this invention limited for use only with a GSM compatible mobile station and network.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). It should be understood that the mobile station 10 can be a vehicle mounted or a handheld device. It should further be appreciated that the mobile station 10 can be capable of operating with one or more air interface standards, modulation types, and access types.

Figure 4:
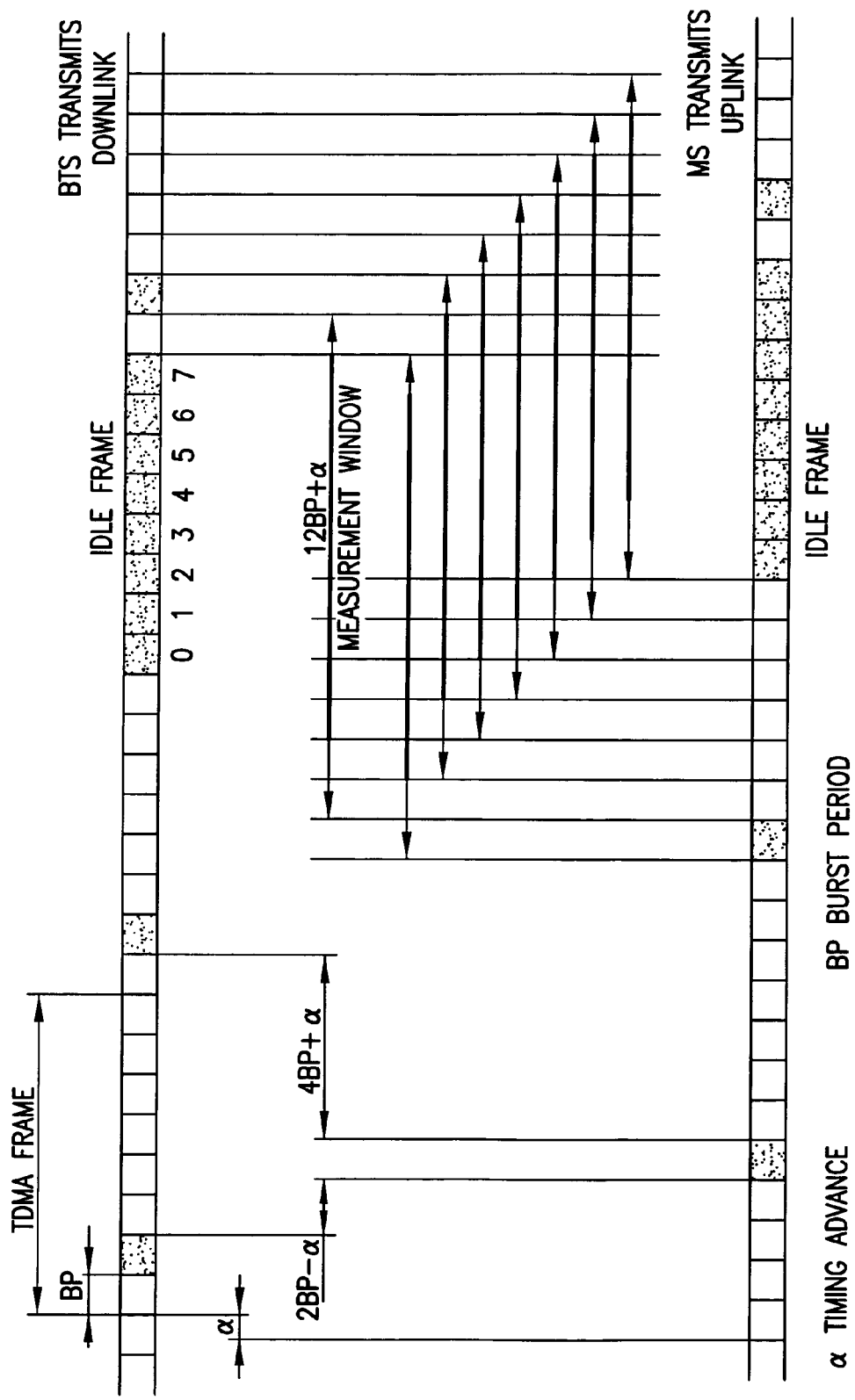
FIG. 4 illustrates measurement windows that are useful in explaining the problem that is overcome by the teachings of this invention.

Having thus described one suitable but not limiting embodiment of a mobile station and radiotelephone system that can be used to practice the teachings of this invention, and referring now also to FIG. 4, the telecommunications network shown in FIG. 2 is assumed to be synchronous. That is, the various base stations are enabled to transmit at specified times under the control of a master timing and synchronization source (which could reside in the MSC 34 or elsewhere within the BMI 32.)

As was indicated previously, within GSM synchronous networks all idle frames of traffic channels occur at the same time. During this common idle frame the mobile station 10 is required to read the BSIC (carried by the SCH bursts) of neighbor cells for handover purposes. The SCH bursts from different base stations are consecutively transmitted during the idle frame.

In accordance with an aspect of this invention the base stations are operated so as to alternate the transmission of SCH bursts within the idle frame in order to ensure fast and reliable BSIC decoding in the receiving mobile station 10.

As was stated above, although the use of the synchronized network allows all of the mobile stations 10 to always receive the idle frames at the same time, it does not imply that all of the channel measurement windows will occur at the same time (refer again to FIG. 4).

In accordance with the teachings of this invention the base stations 30 are operated so as to alternate (or rotate) the transmission of SCH bursts within the idle frame. Depending on the number of different SCH bursts to be sent, a particular SCH transmitted from one base station is never transmitted in the same time slot during two consecutive idle frames. When alternating the transmission of SCH bursts, diversity is used to favor the always-read time slots (typically 4, 5 and 6). This implies that all mobile stations 10 can be enabled to obtain all transmitted information, from these time slots only.

In other words, the SCH transmissions from a plurality of base stations are arranged such that a given mobile station 10 is enabled to receive all pertinent information from a subset of timeslots of an idle frame, that consists of a set of time slots, without regard for what traffic time slot or slots the mobile station 10 is assigned to.

By example, and referring to FIGS. 5–7, FIG. 5 shows six different SCHs to be sent within an idle frame which contains four idle bursts; FIG. 6 shows 12 different SCHs to be sent within the idle frame which contains four idle bursts; and FIG. 7 shows 16 different SCHs to be sent within the idle frame which must contain four idle bursts.

Note, for example, that in FIG. 5 the bursts from base stations 6, 3, 4 and 1 are transmitted in sequence in every other time slot of a first idle frame, then in a second, next idle frame the bursts from base stations 4, 1, 5 and 2 are transmitted in sequence, then in a third, next idle frame the bursts from base stations 5, 2, 6 and 3 are transmitted in sequence. During the fourth, next idle frame the bursts from base stations 6, 3, 4 and 1 are again transmitted in sequence, and the burst transmission pattern thus repeats on a three idle frame basis.

For the twelve base station embodiment shown in FIG. 6 the burst pattern repeats on a six idle frame basis, i.e., base stations 10, 4, 7, 1, followed by base stations 11, 5, 8, 2, followed by base stations 12, 6, 9, 3, followed by base stations 7, 1, 10, 4, followed by base stations 8, 2, 11, 5, followed by base stations 9, 3, 12, 6, after which the pattern repeats.

For the sixteen base station embodiment shown in FIG. 7 the burst pattern repeats in the same fashion, but on an eight idle frame basis.

Reading down a particular column of time slots, e.g., time slot 0 of FIG. 7, note that a first subset (one half) of the set of base stations transmit in sequence (e.g., 13, 14, 15, 16, 9, 10, 11, 12, 13, etc.), while in time slot 2 a second subset (the other half) of the set of base stations transmit in sequence (e.g., 5, 6, 7, 8, 1, 2, 3, 4, 5, etc.) In time slot 4 the first subset of the set of base stations also transmit in sequence, but offset from the transmissions in time slot 0 (e.g., 9, 10, 11, 12, 13, 14, 15, 16, 9, etc.), while in time slot 6 the second subset of the set of base stations also transmit in sequence, but again offset from the transmissions in time slot 2 (e.g., 1, 2, 3, 4, 5, 6, 7, 8, 1, etc.)

Note that the mobile station 10 is thus enabled to receive transmissions from each of n total base stations within n/2 idle frames by monitoring only one half, or less than one half, of the time slots (e.g., time slots 0–2 or 4–6).

It should be appreciated that the teachings of this invention can be employed for any type of information that is intended to be read during a common idle frame of traffic channels within a synchronized network, such as a GSM-based synchronous network, and is not limited to only conveying handover-related information, such as the BSIC and other information. The teachings of this invention may also be applied to other than GSM systems, such as high speed IS-136 and other advanced TDMA systems.

Furthermore, this invention specifies how the mobile station 10 is presented with the information transmitted during a common idle frame. As such, the teachings of this invention do not depend on how the information is transmitted, and the information can be transmitted on the same carrier, on different carriers, from one or several base stations, etc.

Thus, while the invention has been particularly shown and described with respect to preferred embodiments thereof, it will be understood by those skilled in the art that changes in form and details may be made therein without departing from the scope and spirit of the invention.

What is claimed is:

1. A method for presenting information to a mobile station that is transmitted during a common idle frame that contains a set of time slots, comprising arranging individual transmissions such that all pertinent information for a mobile station is transmitted within a subset of timeslots of the idle frame, without regard for which traffic time slot the mobile station is assigned to, wherein the individual transmissions originate from individual ones of a plurality of base stations, and where the base stations are operated so as to alternate the transmission of bursts within the idle frame.

2. A method as in claim 1, wherein depending on a number of different bursts to be sent, a particular burst transmitted from one base station is never transmitted in a same time slot during two consecutive idle frames.

3. A method as in claim 1, wherein the bursts are SCH bursts transmitted from base stations in a synchronous GSM telecommunications system.

4. A synchronous GSM telecommunications system, comprising a plurality of base stations transmitting synchronization channel (SCH) bursts to mobile stations during idle frames, said SCH bursts being transmitted by individual ones of the base stations such that a particular burst transmitted from one base station is never transmitted in a same time slot during two consecutive idle frames.

5. A synchronous GSM telecommunications system, comprising a set of n number of base stations transmitting synchronization channel (SCH) bursts to mobile stations during idle frames, said SCH bursts being transmitted by individual ones of a first subset n/2 of the base stations in sequence during a first time slot over n/2 sequential idle frames, said SCH bursts being further transmitted by individual ones of a second subset n/2 of the base stations in sequence during a second time slot over the n/2 sequential idle frames, such that a particular burst transmitted from one base station is never transmitted in a same time slot during two consecutive idle frames, wherein n is an even integer.

6. A synchronous GSM telecommunications system, comprising a set of n number of base stations transmitting synchronization channel (SCH) bursts to mobile stations during idle frames, said SCH bursts being transmitted by individual ones of a first subset n/2 of the base stations in a first sequence during a first time slot over n/2 sequential idle frames and also in a second, different sequence during a second time slot over the n/2 sequential idle frames, said SCH bursts being further transmitted by individual ones of a second subset n/2 of the base stations in a first sequence during a third time slot over the n/2 sequential idle frames and also in a second, different sequence during a fourth time slot over the n/2 sequential idle frames, wherein a particular burst transmitted from one base station is never transmitted in a same time slot during two consecutive idle frames, and wherein n is an even integer.

* * * * *